United States Patent
McVey

(10) Patent No.: US 8,365,513 B2
(45) Date of Patent: Feb. 5, 2013

(54) TURBOFAN ENGINE OPERATION CONTROL

(75) Inventor: William J. McVey, North Granby, CT (US)

(73) Assignee: United Technologies Corporation, Hartford, CT (US)

(*) Notice: Subject to any disclaimer, the term of this patent is extended or adjusted under 35 U.S.C. 154(b) by 916 days.

(21) Appl. No.: 12/444,856

(22) PCT Filed: Oct. 12, 2006

(86) PCT No.: PCT/US2006/040064
§ 371 (c)(1),
(2), (4) Date: Apr. 9, 2009

(87) PCT Pub. No.: WO2008/045079
PCT Pub. Date: Apr. 17, 2008

(65) Prior Publication Data
US 2010/0011740 A1    Jan. 21, 2010

(51) Int. Cl.
*B63H 11/00* (2006.01)
(52) U.S. Cl. ................. 60/204; 60/242; 60/771
(58) Field of Classification Search ...... 60/226.1–226.3, 60/204, 242, 771, 779; 239/265.11, 265.33, 239/265.37
See application file for complete search history.

(56) References Cited

U.S. PATENT DOCUMENTS

| | | | |
|---|---|---|---|
| 3,472,027 A * | 10/1969 | Snow et al. | 60/236 |
| 3,622,075 A | 11/1971 | Harris | |
| 3,932,058 A | 1/1976 | Harner et al. | |
| 4,068,469 A * | 1/1978 | Adamson | 60/204 |
| 4,242,864 A | 1/1981 | Cornett et al. | |
| 5,048,285 A * | 9/1991 | Schmitt et al. | 60/204 |
| 5,261,227 A | 11/1993 | Giffin, III | |
| 8,001,763 B2 * | 8/2011 | Grabowski et al. | 60/204 |

FOREIGN PATENT DOCUMENTS

EP    0 848 152    6/1998

OTHER PUBLICATIONS

International Search Report for PCT Application No. PCT/US2006/040064, Dec. 3, 2007.

* cited by examiner

*Primary Examiner* — Phutthiwat Wongwian
(74) *Attorney, Agent, or Firm* — Carlson, Gaskey & Olds, P.C.

(57) ABSTRACT

(A1) A turbofan engine (10) is provided that includes a spool (14). The spool (14) supports a turbine (18) and is housed within a core nacelle (12). A fan (20) is coupled to the spool (14) and includes a target operability line. The target operability line provides desired fuel consumption, engine performance, and/or fan operability margin. A fan nacelle (34) surrounds the fan (20) and core nacelle (12) to provide a bypass flow path (39) having a nozzle exit area (40). A controller (50) is programmed to command a flow control device (41) for changing the nozzle exit area (40). The change in nozzle exit area (40) achieves the target operability line in response to an engine operating condition that is a function of airspeed and throttle position. A change in the nozzle exit area (40) is used to move the operating line toward a fan stall or flutter boundary by manipulating the fan pressure ratio.

11 Claims, 2 Drawing Sheets

TURBOFAN ENGINE OPERATION CONTROL

BACKGROUND OF THE INVENTION

This invention relates to a turbofan engine, and more particularly, the invention relates to managing fan operability and operating characteristics.

A typical turbofan engine includes low and high spools housed within a core nacelle. The low spool supports a low pressure compressor and turbine, and the high spool supports a high pressure compressor and turbine. A fan or turbofan is coupled to the low spool. A fan nacelle surrounds the turbofan and core nacelle to provide a bypass flow path having a nozzle. Typically, the nozzle is a fixed structure providing a fixed nozzle exit area.

The fan's operating line must be controlled to avoid undesired conditions such as fan flutter, surge or stall. The fan operating line can be manipulated during engine operation to ensure that the fan operability margin is sufficient. The fan operating line is defined, for example, by characteristics including low spool speed, turbofan airflow and turbofan pressure ratio. Manipulating any one of these characteristics can change the fan operating line to meet the desired fan operability margin to avoid undesired conditions.

The engine is designed to meet the fan operability line and optimize the overall engine performance throughout the flight envelope. As a result, the engine design is compromised to accommodate various engine operating conditions that may occur during the flight envelope. For example, fuel consumption for some engine operating conditions may be less than desired in order to maintain the fan operating line with an adequate margin for all engine operating conditions. For example, fan operating characteristics are compromised, to varying degrees, from high Mach number operation to static conditions for fixed nozzle area turbofan engines. This creates design challenges and/or performance penalties to manage the operability requirements.

What is needed is a turbofan engine that provides improved operability for a variety of engine operating conditions while minimizing performance penalties throughout the flight envelope.

SUMMARY OF THE INVENTION

A turbofan engine control system is provided that includes a spool. The spool supports a turbine and is housed within a core nacelle. A turbofan is coupled to the spool and includes a target operability line. The target operability line provides desired fuel consumption, engine performance, and/or fan operability margin. A fan nacelle surrounds the turbofan and core nacelle to provide a bypass flow path having a nozzle exit area. A controller is programmed to command a flow control device for effectively changing the nozzle exit area. In one example, the physical size of the nozzle exit area is changed.

The effective change in nozzle exit area achieves the target operability line in response to an engine operating condition that is a function of airspeed and throttle position. A change in the effective nozzle exit area is used to move the operating line toward a turbofan stall or flutter boundary by manipulating the turbofan pressure ratio. As a result, engine operating conditions that normally have unnecessarily large operating margins with conventional fixed nozzles can be made more efficient.

In one example, the nozzle exit area size is decreased as the air speed increases, with the nozzle exit area at its smallest during a cruise condition. For full throttle conditions the nozzle exit area may also be commanded to its smallest size. In one example, the nozzle exit area is at a fully open position at no or low throttle conditions.

These and other features of the present invention can be best understood from the following specification and drawings, the following of which is a brief description.

DETAILED DESCRIPTION OF THE PREFERRED EMBODIMENT

Figure 1:
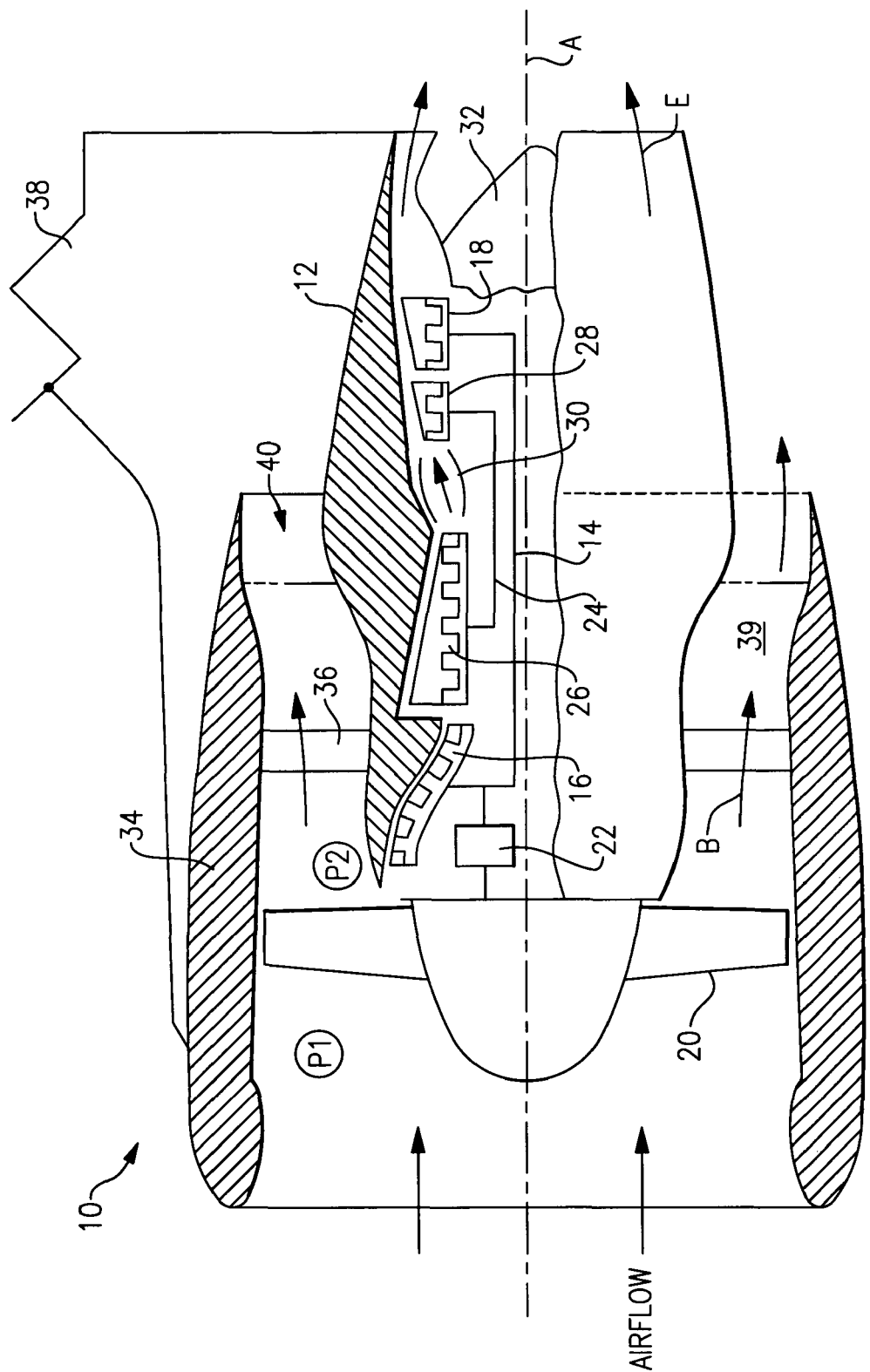
FIG. 1 is a cross-sectional view of an example turbofan engine.

A geared turbofan engine 10 is shown in FIG. 1. A pylon 38 secures the engine 10 to the aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8 M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and take-off. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the exit nozzle area 40.

In one example, the flow control device 41 includes multiple hinged flaps 42 arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example.

Providing the engine 10 with an effectively adjustable nozzle exit area 40 enables the engine to operate more efficiently during engine conditions within the flight envelope that would normally result in and unnecessarily large fan operability margin. This large fan operability margin results in higher than desired fuel consumption in fixed nozzle engines, for example. A change in the effective nozzle exit area, which changes the turbofan pressure ratio, is used to move the operating line toward the stall or flutter boundary of the turbofan 20 to a target operability line. The turbofan pressure ratio is the ratio of P1 and P2 (FIG. 1). Better fuel consumption, for example, is achieved by decreasing the turbofan pressure ratio toward the stall or flutter boundary, which decreases the fan operability margin.

Figure 2:
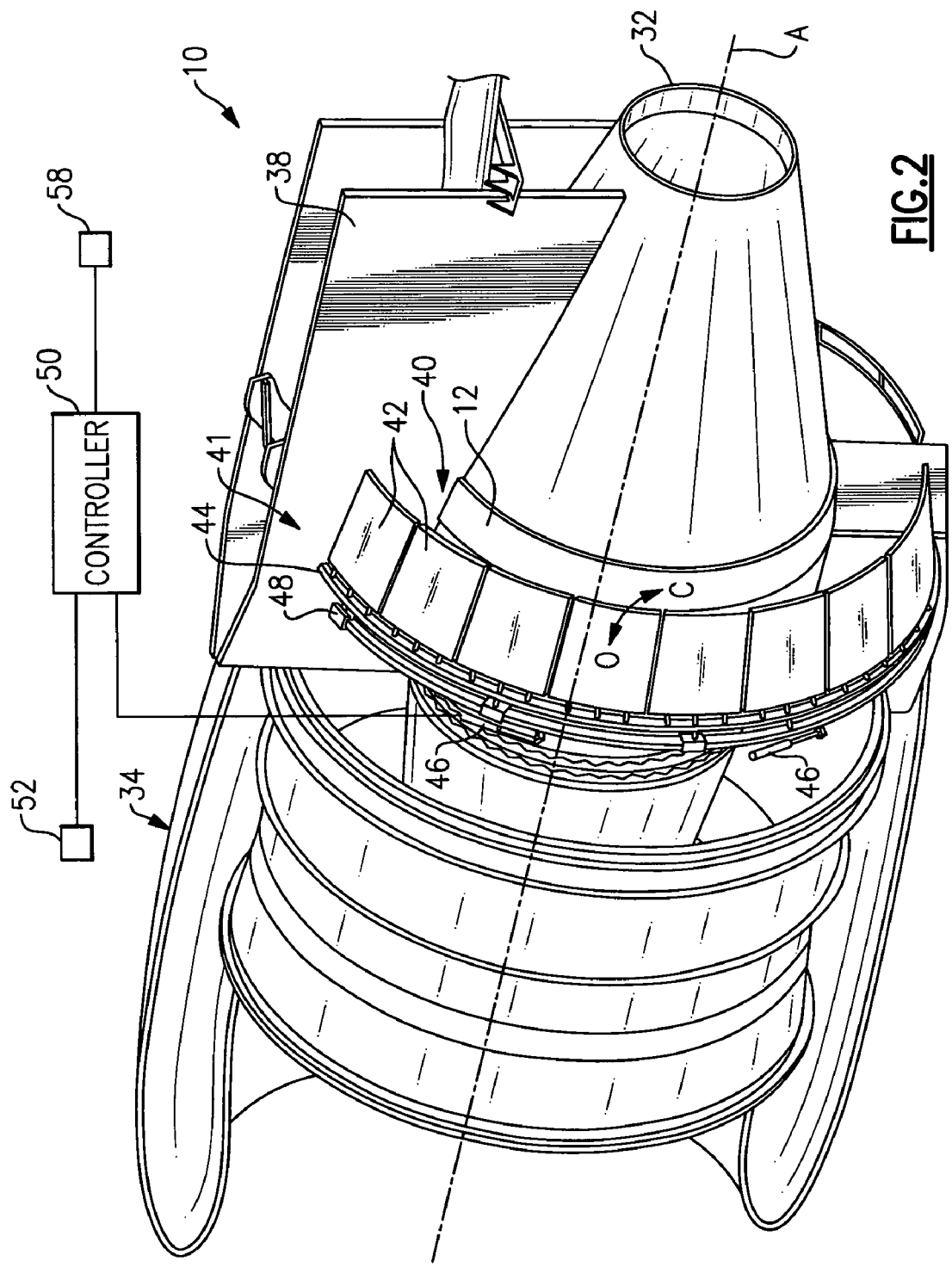
FIG. 2 is a partially broken perspective view of the turbofan engine shown in FIG. 1.

The engine 10 includes a controller 50 that commands the flow control device 41. In the example shown in FIG. 2, the controller 50 commands the actuators 46 to move the flaps 42 radially outward and inward between open and closed conditions O, C. An air speed sensor 52 communicates with the controller 50 to provide the aircraft airspeed. In one example, the controller 50 commands the flow control device 41 to effectively close as the air speed increases. A throttle position sensor 58 communicates a throttle position, corresponding to an engine power setting, to the controller 50. In one example, the controller 50 commands the flow control device 41 to effectively close as the throttle position increases. Increasing the nozzle exit area 40 decreases the backpressure (P2) on the turbofan 20 thereby lowering its pressure ratio.

In one example, an aircraft operates between 0 and 0.8 Mach. At 0 Mach (aircraft on runway idling), the nozzle exit area 40 is effectively increased to its fully open position, which reduces the turbofan pressure ratio and provides improved idle fuel consumption. The nozzle exit area 40 is progressively closed from take-off to cruise. The nozzle exit area 40 is fully open at full throttle, take-off (for example, 0.3 Mach). The nozzle exit area 40 is fully closed at cruise once at altitude (for example, 0.8 Mach). During climb (for example, 0.6 Mach), the nozzle exit area 40 is positioned at an intermediate condition between the closed and open conditions C,O. The nozzle exit area 40 may also be positioned at an intermediate condition during take-off.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine comprising:
   a spool supporting a turbine and housed within a core nacelle;
   a turbofan coupled to the spool, the turbofan including a target operability line;
   a fan nacelle surrounding the turbofan and core nacelle to provide a bypass flow path having a nozzle exit area;
   a controller programmed to command a flow control device for effectively changing the nozzle exit area to achieve the target operability line in response to an engine operating condition including at least one of airspeed and throttle position; and
   wherein the flow control device includes effectively open and closed conditions, the command effectively changing the nozzle exit area between the effectively open and closed conditions; and
   wherein the effectively open condition corresponds to an engine idle condition.

2. The turbofan engine according to claim 1, wherein the target operability line is near a stall/flutter boundary of the turbofan.

3. The turbofan engine according to claim 1, comprising an airspeed sensor in communication with the controller for providing an aircraft airspeed.

4. The turbofan engine according to claim 1, comprising a throttle position sensor in communication with the controller for providing a throttle position.

5. The turbofan engine according to claim 1, wherein the effectively open and closed conditions correspond to physically open and closed nozzle exit areas.

6. The turbofan engine according to claim 5, wherein the flow control device includes an actuator adapted to move a flap between the physically open and closed positions in response to the command.

7. The turbofan engine according to claim 1, wherein the effectively closed condition is adapted to throttle a flow through the bypass flow path compared to the effectively open condition.

8. The turbofan engine according to claim 1, wherein the effectively closed condition corresponds to a cruise condition.

9. The turbofan engine according to claim 8, comprising an intermediate condition between the effectively open and closed conditions, the intermediate condition corresponding to at least one of a take-off condition and a climb condition.

10. A method of managing a turbofan engine turbofan operating line comprising the steps of:
    detecting an air speed and throttle position;
    selecting a target fan operating line of a turbofan;
    effectively changing a turbofan bypass nozzle exit area in response to the air speed and throttle position to obtain the target fan operating line; and
    wherein the nozzle exit area is effectively decreased with an increase in airspeed and is effectively decreased with an increase in throttle position.

11. The method according to claim 10, wherein effectively increasing the nozzle exit area decreases a pressure ratio across the turbofan by decreasing a turbofan backpressure.

* * * * *